April 27, 1943.　　　　G. G. MORIN　　　　2,317,691
PHOTOGRAPHIC ENLARGER
Filed May 17, 1940
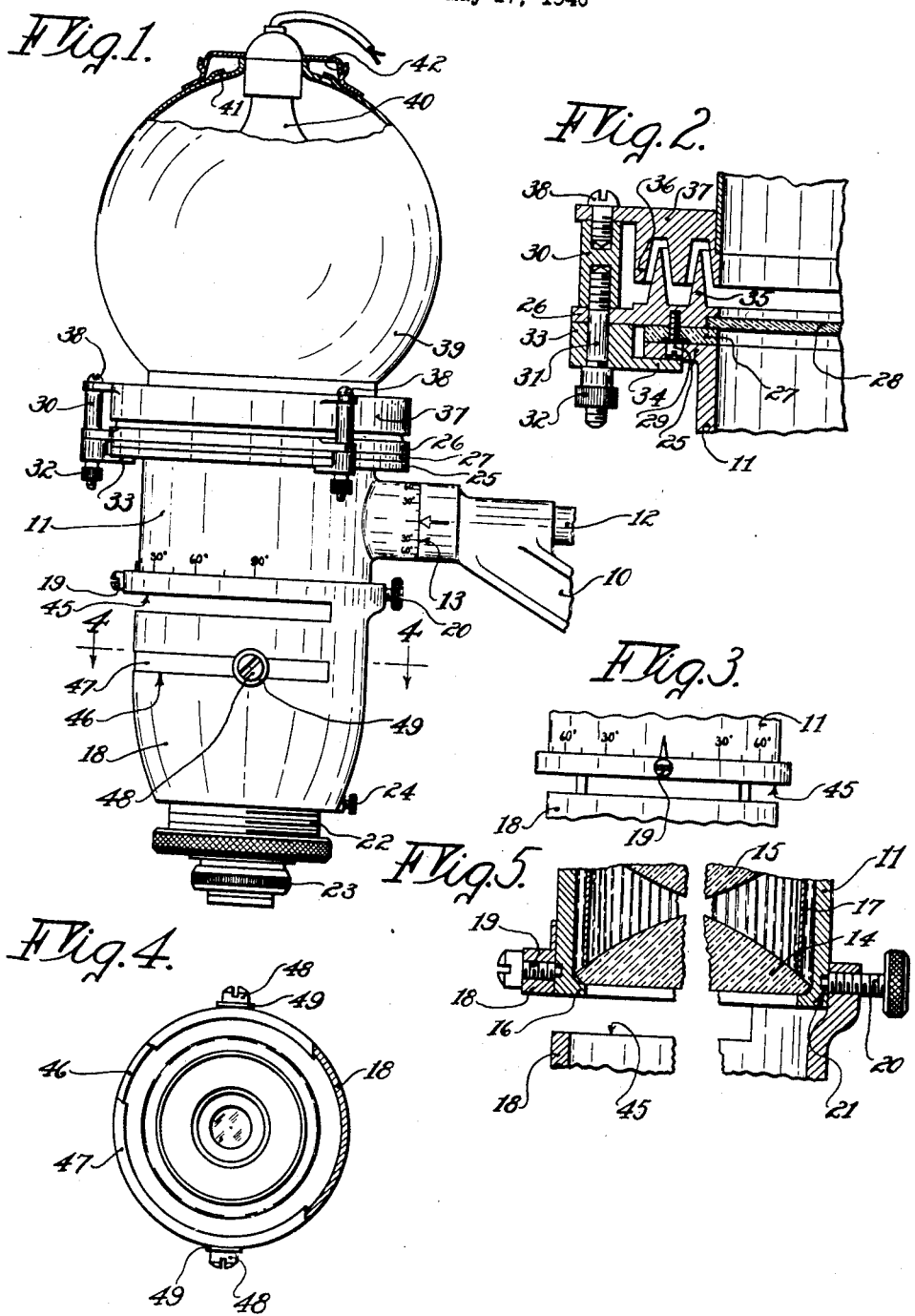
INVENTOR
GEORGE G. MORIN
BY Chapin & Neal
ATTORNEYS Patented Apr. 27, 1943

2,317,691

UNITED STATES PATENT OFFICE 2,317,691

PHOTOGRAPHIC ENLARGER

George G. Morin, Holyoke, Mass.

Application May 17, 1940, Serial No. 335,707

5 Claims. (Cl. 88—24)

This invention relates to photographic enlargers and has particular reference to the head structure thereof. One object of the invention is to provide a simple construction permitting the head to be tilted in any direction relative to the projected image so that distortion in the negative may be corrected regardless of whether the normal position of the negative is lengthwise of or transverse to the strip film of which it forms a part. A further object is to provide an improved construction of the enlarger head so that heat from the light source will be completely cut off from the negative even though a light source having considerable heat radiation is employed. A further object is to improve the enlarger head construction in such a way that the condenser lens will not have to be changed if a projecting lens of one focal length is substituted for one of a different focal length. A further object is to provide an enlarger head construction permitting of this replacement of projection lenses without the necessity of the introduction of any bellows construction between the condenser and the negative. Additional objects will appear from the following description and claims.

Referring to the drawing:

Fig. 1 is a side elevation, partly broken away, of an enlarger head constructed in accordance with my invention;

Fig. 2 is a detail section illustrating the connection between the main housing and the light housing;

Fig. 3 is a partial front elevation looking from the left in Fig. 1;

Fig. 4 is a section on line 4—4 of Fig. 1; and

Fig. 5 is a sectional detail partially broken away showing the manner of mounting the negative and lens housing with respect to the enlarger head proper.

The enlarger head is shown as being carried by an arm 10 which may be vertically adjustable on the usual mounting in a manner not necessary to describe here. A condenser housing 11 is secured to this arm by a clamp screw 12 by which it may be held in adjusted position upon a horizontal axis in a manner described for example in my prior application, Serial No. 308,542, filed December 11, 1939. By this adjustment the condenser housing and the other parts carried therewith may be swung into various angular positions in a single plane. The angular position of the condenser head about the axis of the screw 12 may be indicated by grooves 13.

Within the condenser housing 11 are condensers 14 and 15 of the usual plano-convex form, the lower of these being held by a ledge 16 formed within the condenser housing and the upper of these being held by a spacer 17 in proper relation thereto. The upper condenser may if desired be secured by a spring rim in the manner described in my prior application.

Secured to the condenser housing 11 is a lens housing 18 having a fixed screw 19 and an adjustable clamp screw 20 threaded through the upper portion of the housing 18 with their ends received within a groove 21 formed in the condenser housing, as is best shown in Fig. 5. By this means the lens housing may be adjusted around its vertical axis relative to the condenser housing. Unless it is desired to remove the lens housing the screw 19 is left alone, all that is necessary in order to adjust the lens housing around its vertical axis being to back off the screw 20 sufficiently to stop its clamping action without withdrawing it entirely from the groove 21. The lens housing has an adjustable barrel 22 carrying the usual projection lenses 23 the barrel being held in adjusted focal position by a clamp screw 24. As will be described below, the lens housing also supports a negative holder, and inasmuch as the lens housing may be moved around a vertical axis the negative holder can thus be adjusted in any desired angular relation to the plane in which the condenser housing may be swung about the axis of the screw 12. In the case of the smaller size films negatives are generally placed in the enlarger in strip form, the true vertical position of the individual negatives varying from transversely across to longitudinally along the film strip in accordance with the way the camera was held when the picture was taken. Distortion which requires correction during enlarging is generally from top to bottom of the negative, and in order to correct this, the enlarger head should be tilted at an angle to thereby change the relative distances from the negative of the top and bottom of the projected image. If the top to bottom line of the negative runs at right angles to the axis of the screw 12 this correction may be readily accomplished by a rotation of the enlarger head about this screw, but if the negative does not have its top to bottom line in this direction, it is necessary to rotate the negative until it does. This can be readily accomplished by rotating the lens housing 18 around its vertical axis thus avoiding the complexity incident to an attempt to tilt the whole enlarger head about two mutually perpendicular axes.

In order to prevent heat from the lamp housing reaching the negative a novel construction is provided. The condenser housing 11 is provided with a lateral flange 25 supporting an assemblage comprising a ring 26 preferably of cast metal, and an insulating ring 27 with a disk of heat resisting glass 28 held between them. The assemblage is held together by screws 29 the heads of which may serve as dowels by fitting in holes formed in the flange 25. The heat resisting glass 28 shuts off the transmission of radiant heat from the lamp housing and the insulating member 27 cuts off the flow of heat between the metal parts. To further cut down the latter form of heat transmission, insulating bushings 30 are provided at spaced points around the periphery of the ring 26 having screws 31 threaded into them through the ring. Thumb nuts 32 on the screws bear against clamping members 33 having finger portions 34 formed preferably integrally therewith and extending underneath the flange on the ring 25. By loosening thumb nuts 32, and swinging finger portions 34 from under the flange on ring 25, ring 26 and all the parts carried thereby can be removed from the condenser housing.

The ring 26 is provided with a plurality of annular ribs 35 which are preferably made tapering for convenience in manufacture. Interfitting with these ribs are complementary ribs 36 formed on a second ring member 37 which is held to the insulating bushings 30 by screws 38. The insulating bushings are of such a length that they hold the ribs 35 and 36 spaced from each other as best shown in Fig. 2 thus affording an air passage first between the peripherally spaced bushings 30 and then between the spaced annular ribs. The ring 37 serves as a carrier for the lamp housing 39 which may be made in any desired form, preferably having vents 41 and 42 at the top to permit the exit of air without the admission of light. A very complete protection of the condensers and the negative from the heat of the lamp 40 is thus provided, the lamp housing being kept cool by ventilation, and the condenser housing being protected both from radiant and conducted heat coming from the lamp housing.

In order to hold the negative in postion in the lens housing 18 a slot 45 is provided in which any suitable form of negative holder, such as for example that shown in my prior application, Serial No. 229,359, filed September 10, 1938, may be held. To permit the same structure to be used with lenses 23 of different focal length a second slot 46 is provided at a point below slot 45. It is recognized that the lens should be set so that the light rays from the condenser can be focused upon its optical center. In previous constructions, it has been necessary to shift the lens toward and from the negative holder when changing from a lens of one focal length to the lens of another, this, of course, altering the distance of the lens from the condenser. While the latter distance is not critical to the same degree as the ordinary focusing action, the change in illumination when shifting from a lens of 3 inch focal to a lens of 2 inch focal length may be quite marked. In the present case the lens is left in a single position irrespective of its focal length and the negative holder is shifted from the slot 45 to the slot 46 if a lens of shorter focal length is to be used. The slot not in use is closed to prevent the admission of light by a segment 47 held in position in any suitable way.

As shown in Fig. 4, the segment may, for example, be provided with diametrically opposite screws 48 having washers 49 which give a frictional grip upon the outside of the lens housing.

What I claim is:

1. A photographic enlarger comprising a supporting arm, a housing mounted on said arm, a light source and a condensing lens unit carried thereby, a lens and negative housing mounted on the first mentioned housing, means in said last named housing for selectively receiving any one of a plurality of lenses of different focal lengths, a plurality of spaced apart negative holder receiving slots formed in the lens housing at varying distances from said lens receiving means, and means for closing all but one of the negative receiving slots.

2. A photographic enlarger comprising a supporting arm, a housing mounted on said arm, a light housing mounted on said first housing, peripherally spaced heat insulating members joining said two housings, a laterally projecting member on the light housing having one or more laterally spaced annular ribs substantially coaxial with the housings, a member having one or more laterally spaced annular ribs substantially coaxial with the housings and spaced from and interfitting with the ribs on the laterally projecting member, a heat insulating ring located between the member and the first housing, and means on the first housing for receiving a negative holder and a lens.

3. A photographic enlarger comprising a supporting arm, a housing mounted on said arm, a light housing mounted on said first housing, peripherally spaced heat insulating members joining said two housings, a laterally projecting member on the light housing having one or more laterally spaced annular ribs substantially coaxial with the housings, a member having one or more laterally spaced annular ribs substantially coaxial with the housings and spaced from and interfitting with the ribs on the laterally projecting member, a heat insulating ring located between the member and the first housing, a disk of heat resistant glass interposed between said member and said heat insulating ring, and means on the first housing for receiving a negative holder and a lens.

4. A photographic enlarger comprising a supporting arm, a housing rotatably mounted on said arm on a horizontal axis, a light source and a condensing unit carried by the first housing, a lens and negative housing mounted in the first housing on a vertical axis, a barrel threaded into the lens housing for selectively receiving any one of a plurality of lenses of different focal lengths, a plurality of spaced apart negative holder receiving slots formed in the lens housing at varying distances from said barrel, and means for closing all but one of the negative receiving slots.

5. A photographic enlarger comprising a supporting arm, a first housing, a light housing mounted on said first housing, one of said housings being mounted on said arm, peripherally spaced heat insulating members joining said two housings, said housings having axially extending mutually overlapping flanges arranged circumferentially of the housings and separated one from the other to exclude light and to permit the passage of air, and means on the first housing to receive a negative holder and a lens.

GEORGE G. MORIN.